United States Patent
Haeberle et al.

(10) Patent No.: US 8,959,063 B2
(45) Date of Patent: Feb. 17, 2015

(54) MANAGING INCIDENT REPORTS

(71) Applicants: Tilmann Haeberle, Wiesloch (DE); Herbert Stegmueller, Bruchsal (DE)

(72) Inventors: Tilmann Haeberle, Wiesloch (DE); Herbert Stegmueller, Bruchsal (DE)

(73) Assignee: SAP SE, Walldorf (DE)

( * ) Notice: Subject to any disclaimer, the term of this patent is extended or adjusted under 35 U.S.C. 154(b) by 107 days.

(21) Appl. No.: 13/622,676

(22) Filed: Sep. 19, 2012

(65) Prior Publication Data

US 2014/0081925 A1 Mar. 20, 2014

(51) Int. Cl.
*G06F 17/00* (2006.01)
*G06F 17/30* (2006.01)

(52) U.S. Cl.
CPC ...... *G06F 17/3015* (2013.01); *G06F 17/30489* (2013.01)
USPC ............ 707/692; 707/664; 707/758; 707/805

(58) Field of Classification Search
CPC .......... G06F 17/3015; G06F 17/30156; G06F 17/30489; G06F 21/552; G06F 17/30303; G06F 3/0641; G06F 11/1453
USPC .......................... 707/664, 692, 758, 792, 805
See application file for complete search history.

(56) References Cited

U.S. PATENT DOCUMENTS

| | | | |
|---|---|---|---|
| 8,065,315 B2 | 11/2011 | Rapp et al. | |
| 8,112,747 B2 | 2/2012 | Haeberle et al. | |
| 8,176,483 B2 | 5/2012 | Hoefler et al. | |
| 8,209,669 B2 | 6/2012 | Schneider et al. | |
| 8,212,683 B2 | 7/2012 | Klein et al. | |
| 8,234,633 B2 | 7/2012 | Schneider et al. | |
| 2003/0225748 A1 | 12/2003 | Haeberle | |
| 2005/0068181 A1* | 3/2005 | Wang | 340/572.1 |
| 2007/0162485 A1* | 7/2007 | Haeberle et al. | 707/102 |
| 2007/0164849 A1 | 7/2007 | Haeberle et al. | |
| 2007/0174731 A1 | 7/2007 | Haeberle et al. | |
| 2008/0114628 A1* | 5/2008 | Johnson et al. | 705/7 |
| 2008/0262860 A1 | 10/2008 | Schneider et al. | |
| 2009/0177926 A1 | 7/2009 | Schneider et al. | |
| 2009/0273682 A1* | 11/2009 | Shekarri et al. | 348/207.1 |
| 2009/0276708 A1* | 11/2009 | Smith et al. | 715/716 |
| 2010/0057677 A1 | 3/2010 | Rapp et al. | |
| 2010/0070289 A1 | 3/2010 | Haeberle et al. | |
| 2010/0082497 A1 | 4/2010 | Biesemann et al. | |
| 2010/0162105 A1* | 6/2010 | Beebe et al. | |
| 2011/0133945 A1 | 6/2011 | Klein et al. | |
| 2011/0202969 A1* | 8/2011 | Warn et al. | 726/1 |
| 2012/0047079 A1 | 2/2012 | Biesemann et al. | |
| 2012/0066218 A1 | 3/2012 | Rapp et al. | |
| 2012/0304012 A1* | 11/2012 | Atkins et al. | 714/37 |
| 2012/0304022 A1* | 11/2012 | Carey et al. | 714/48 |
| 2013/0262082 A1* | 10/2013 | McKeeman et al. | 704/9 |
| 2013/0325951 A1* | 12/2013 | Chakra et al. | 709/204 |

* cited by examiner

*Primary Examiner* — Phong Nguyen

(74) *Attorney, Agent, or Firm* — Fish & Richardson P.C.

(57) ABSTRACT

The present disclosure describes methods, systems, and computer program products for managing incident reports can include receiving alert messages from multiple tenants and aggregating the alert messages into a reduced, correlated incident reports. For example, the method includes receiving, from a number of tenants, alert reports that represent at least one system alert incident associated with the tenants. The alert reports can be collected and analyzed for duplicate reports. The analysis for duplicate reports can include identifying a number of duplicate alert reports and correlating each identified duplicate alert reports into a correlated incident report. The correlated incident report can be aggregated into a summarized incident report for processing.

17 Claims, 5 Drawing Sheets

FIG. 5

| Tenant ID | SID | Client (Physical) | Tenant In Downti... | Subject | Status | Inf Alert Close | Last Updated On |
|---|---|---|---|---|---|---|---|
| 00000000000700003237 | QK2 | 004 | Yes | QK2_004: FSI view activati | 1 - Open | X | 27.09.2013 19:37 UTC |
| 00000000000700004078 | QK3 | 029 | No | QK3_029: FSI view activati | 1 - Open | X | 27.09.2013 02:51 UTC |
| 00000000000700003826 | QK2 | 011 | Yes | QK2_011: FSI view activati | 1 - Open | X | 26.08.2013 19:31 UTC |
| 00000000000700003838 | QK2 | 019 | Yes | QK2_019: FSI view activati | 1 - Open | X | 26.08.2013 19:31 UTC |
| 00000000000700003839 | QK2 | 020 | Yes | QK2_020: FSI view activati | 1 - Open | X | 26.08.2013 19:31 UTC |
| 00000000000700003236 | QK2 | 003 | Yes | QK2_003: FSI view activati | 1 - Open | X | 26.08.2013 19:31 UTC |
| 00000000000700003629 | QK2 | 041 | Yes | QK2_041: FSI view activati | 1 - Open | X | 26.08.2013 19:31 UTC |
| 00000000000700003885 | QK2 | 033 | Yes | QK2_033: FSI view activati | 1 - Open | X | 26.08.2013 19:31 UTC |

MANAGING INCIDENT REPORTS

BACKGROUND

The present disclosure relates to software, computer systems, and computer-implemented methods for incident reports management.

In many instances, computer systems running various software generate reports regarding operation incidents of the software. For example, the incident reports can describe any malfunction or unexpected behavior of the software. The computer systems may be connected to a web center (e.g., a service provider cockpit) for processing the incident reports and enabling the web center (e.g., automation or users interacting with the web center) to provide solutions to the computer systems. The web center provides support for the computer systems and handles individual incident report. In some situations, the scale of the computer systems can increase to hundreds, thousands, or more. The incident reports created by such large scale computer systems can pose challenges to the web center handling all the incident reports generated in the computer systems.

SUMMARY

The present disclosure describes methods, systems, and computer-readable media for managing incident reports. In many instances, software of computer systems can generate reports regarding operation incidents. For example, the incident reports may describe any malfunction or unexpected events of the software. The computer systems may be connected to a web center (e.g., a service provider) for processing the incident reports and enabling the web center to provide solutions to the computer systems. The web center provides support for the computer systems and handles individual incident reports. In some situations, the scale of the computer systems can increase to hundreds, thousands, or more; and the large scale of computer systems can pose structure, resources, and other challenges to the web center. The methods described in the present disclosure can reduce the total number of incident reports to be processed by the web center while responding to all alert messages in the incident reports. In general, computer system software generates incident reports including a number of events or alerts. In some implementations, prior to sending all incident reports for processing at the web center, similar events or alerts can be aggregated and/or correlated across connected computer systems before creation of incident reports. By processing a duplicate check logic in a central service provider cockpit, duplicate events or alerts can be accumulated and grouped together for processing. In addition, health checks can be extended to run across multiple computer systems, so that an incident report describing events or alerts of multiple computer systems can be created and sent for processing at the web center, further reducing the total number of incident reports to be processed.

One computer-implemented method includes receiving, from a plurality of tenants in at least one multi-tenant system, a plurality of alert reports, each alert report representing at least one system alert incident associated with the plurality of tenants in the at least one multi-tenant systems. The plurality of alert reports is analyzed for duplicate alert reports by identifying duplicate alert reports and correlating each plurality of duplicate alert reports into a correlated incident report. The correlated incident reports are aggregated into at least one summarized incident report.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features:

A first aspect, combinable with the general implementation, includes sending the at least one summarized incident report to a multi-tenant monitoring system for processing.

In a second aspect, combinable with any of the previous aspects, wherein identifying the duplicate alert reports includes generating a hash code corresponding to each of the plurality of alert reports; and comparing each of the generated hash codes to the plurality of the other generated hash codes and previously-generated hash codes associated with previously received alert reports to identify duplicate alert reports having similar generated hash codes.

In a third aspect, combinable with any of the previous aspects, wherein correlating the plurality of alert reports comprises identifying a correlation key where the correlation key correspond to at least one generated hash code of a particular alert report. The method further includes identifying a common correlation key for at least two alert reports; and associating the at least two alert reports having the common correlation key with a correlated incident report.

A fourth aspect, combinable with any of the previous aspects, wherein the plurality of alert reports are received at a multi-tenant monitoring system. The method further includes identifying at least one preexisting summarized incident report at the multi-tenant monitoring system; and comparing the at least one summarized incident report with the at least one preexisting summarized incident reports.

A fifth aspect, combinable with any of the previous aspects, includes collecting, at a system tenant of a particular multi-tenant system, the plurality of alert reports associated with a particular multi-tenant system prior to analyzing the plurality of alert reports from the single multitenant system.

A sixth aspect, combinable with any of the previous aspects, wherein the plurality of alert reports comprises system problem reports (SPR).

A seventh aspect, combinable with any of the previous aspects, wherein each alert report of the plurality of alert reports is generated in a corresponding tenant of a multi-tenant system.

An eighth aspect, combinable with any of the previous aspects, wherein each alert reports comprises alert classification fields of at least one of check group, check ID, event key, or key fields.

A ninth aspect, combinable with any of the previous aspects, wherein the received alert reports are received from at least a first multi-tenant system and a second multi-tenant system different than the first multi-tenant system.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 5 illustrates an example user interface of a service provider cockpit.

DETAILED DESCRIPTION

Figure 1:
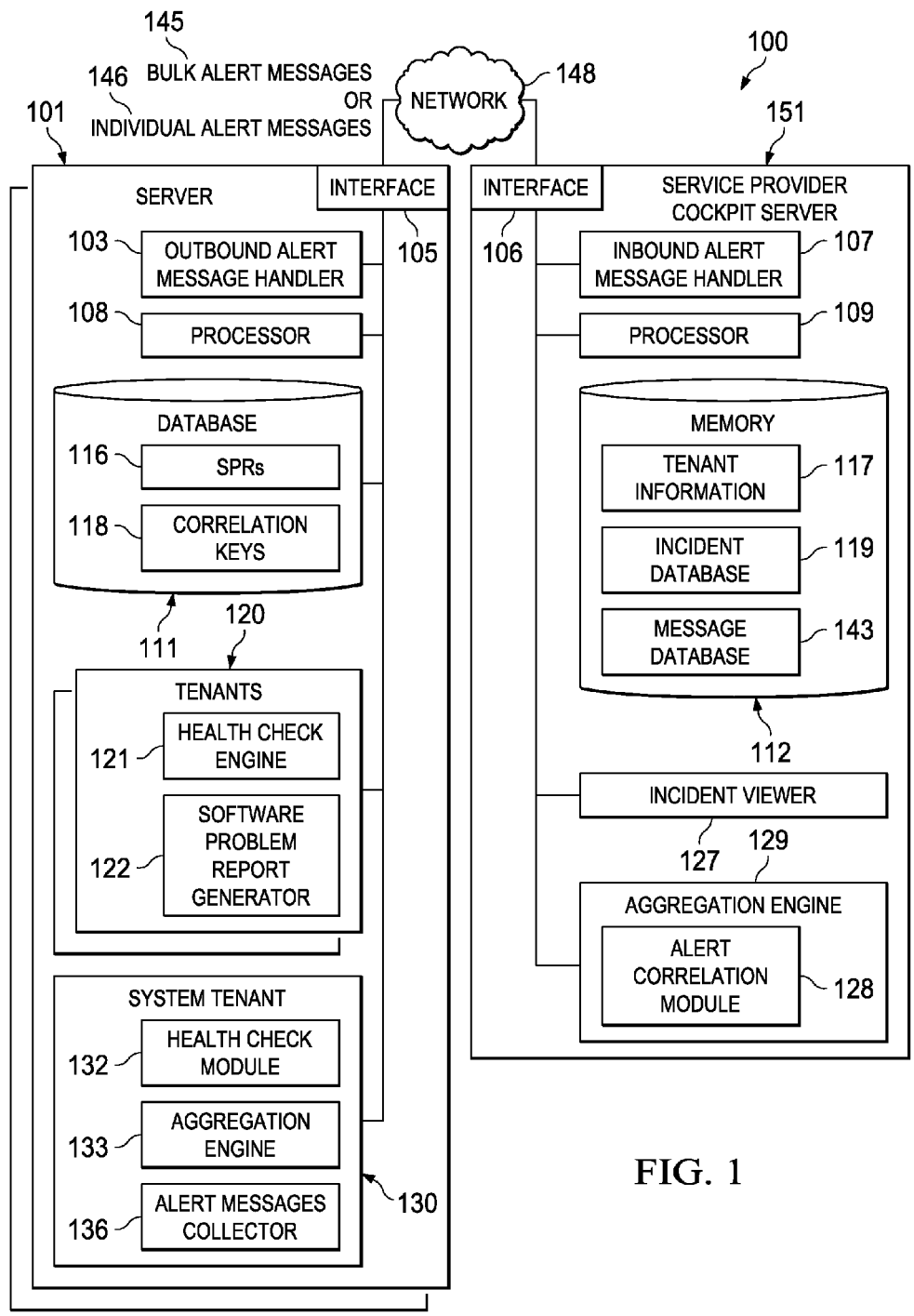
FIG. 1 illustrates an example environment for implementing various features of a system for managing incident reports.

This specification describes methods, systems, and computer-readable media for managing incident reports. In many instances, software of computer systems can generate reports regarding operation incidents. For example, the incident reports may describe any malfunction or unexpected events of the software. The computer systems may be connected to a web center (e.g., a service provider) for processing the incident reports and enabling the web center to provide solutions to the computer systems. The web center provides support for the computer systems and handles individual incident reports. In some situations, the scale of the computer systems can increase to hundreds, thousands, or more; and the large scale of computer systems can pose structure, resources, and other challenges to the web center. The methods described in the present disclosure can reduce the total number of incident reports to be processed by the web center while responding to all alert messages in the incident reports. In general, computer system software generates incident reports including a number of events or alerts. In some implementations, prior to sending all incident reports for processing at the web center, similar events or alerts can be aggregated and/or correlated across connected computer systems before creation of incident reports. By processing a duplicate check logic in a central service provider cockpit, duplicate events or alerts can be accumulated and grouped together for processing. In addition, health checks can be extended to run across multiple computer systems, so that an incident report describing events or alerts of multiple computer systems can be created and sent for processing at the web center, further reducing the total number of incident reports to be processed.

At a high level, the disclosed methods and systems can manage large scale incident reporting across multiple computer systems by correlating and aggregating events and/or incidents before creating reports for processing. In some implementations, a health check engine can detect an alert in a tenant system. A software problem report can be created in the tenant system for the detected alert. The alert can then be sent to a monitoring system or application used to monitor problems and issues with one or more multi-tenant systems (e.g., a service provider cockpit) using optimized messages (e.g., optimized for size and/or performance). The messages can include alert classification fields, for example, such as check group, check ID, event key, key fields, among others. Alerts from various tenants in a system can be sent in a single alert message that includes all software problem report identifications of the detected alert. Alert message creation and sending can be performed at a system tenant. The monitoring system examines the alert message for an open incident based on certain correlation rules. If an incident exists, the affected tenant can be updated; otherwise a new incident is created. Reference to software problem reports can be available for the incident (e.g., for obtaining context data when necessary, the context data can be previous summarized incident reports). As a result, when a user needs to analyze a problem, the context data of the software problem report can be loaded dynamically for the user for root cause analysis. In some implementations, the alert messages can be aggregated at the system tenant for optimized size and/or performance before sending to monitoring system. In other implementations, the alert messages can be aggregated and optimized for processing at the monitoring system after being received. In still other implementations, the aggregation process can be executed at both the system tenant and the monitoring system for multi-level aggregation/optimization.

FIG. 1 illustrates an example environment 100 for implementing various features of a system for managing incident reports. The illustrated environment 100 includes, or is communicably coupled with, a server 101 and a monitoring system (here, a service provider cockpit server) 151. At least some of the communications between the service provider cockpit server 151 and the server 101 may be performed across or via network 148. The server 101 can include or be connected to at least one system tenant 130 and multiple tenants 120. Multiple tenants on a single server can be provided using multitenancy operations. Multitenancy, in general, refers to a principle in software architecture where a single instance of software runs on a server, serving multiple clients or client organizations (tenants). Multitenancy is contrasted with a multi-instance architecture where separate software instances (or hardware systems) are set up for different clients. With a multitenant architecture, a software application is designed to virtually partition its data and configuration, and each client organization works with a customized virtual application instance. Multitenancy can provide significant cost savings by reducing overhead associated with the IT resources needed to perform tasks that may otherwise be performed independently at multiple systems.

Returning to FIG. 1, while the illustrated tenants 120 are part of the server 101, in many implementations the tenants 120 or the system tenant 130 can be external to the server 101. The system tenant 130 can be structurally and functionally similar to the tenants 120 in general. Further, a plurality of servers 101 may be associated with the service provider cockpit server 151. As illustrated in FIG. 1, the tenants 120 include at least a health check engine 121 and a software problem report (SPR) generator 122. The system tenant 130 includes a heath check module 132, an aggregation engine 133, and an alert message collector 136. At a high level, the health check engine 121 in each tenant 120 can detect alerts or problems in the tenant 120. The detected alerts or problems can be processed at the SPR generator 122 to create one or more SPRs. Traditionally, the SPRs may be sent to support centers for direct processing. This may be inefficient and over-occupy resources if the number of tenants 120 increases significantly (e.g., tens of thousands of tenants 120). The current disclosure uses plural aggregation engines to analyze the generated SPRs for reducing duplicates, therefore saving network traffic and system resources, while also increasing SPR processing efficiency.

The system tenant 130 can use the aggregation engine 133 to detect duplicate SPRs among those generated in the tenants 120. The aggregation engine 133 may include an alert correlation module to create correlation keys 118 to each alert in the SPRs. The alert message collector 136 may collect the alerts for regrouping in the aggregation engine 133. The aggregation engine 133 can generate a correlated incident report that is optimized for size and/or performance. The system tenant 130 can generate a bulk alert message 145 and send the bulk alert message 145 via an outbound alert message handler 103. The bulk alert message 145 can include the alerts contained in the SPRs 116 generated by the tenants 120. The bulk alert message 145 can be received at the service provider cockpit server 151 via the network 148. The bulk alert message 145 can first be handled by an inbound alert message handler 107.

The service provider cockpit server 151 includes an incident viewer 127 and an aggregation engine 129 for processing and displaying the bulk alert message 145. For example, the aggregation engine 129 can further aggregate incident reports based on tenant information 117, incident history stored at the incident database 119, and the message database 143. The aggregation engine 129 may include an alert correlation module 128 for identifying and reducing duplicate alerts. The incident viewer 127 can enable users to interact with a summarized incident report generated from the aggregation engine 129. In some instances, the aggregation engine 129 may handle the incoming messages (e.g., the individual alert messages 146) and perform a single step aggregation for the incident viewer 127 (i.e., aggregation process is not performed at the server 101, resulting in less data manipulation/reduction). In other instances, the aggregation engine 129 may perform a second level aggregation to the bulk alert messages 145 that have been optimized/aggregated using the aggregation engine 133 of the system tenant 130. The incident viewer 127 can allow users to close, clear, or modify the status of the aggregated incident reports after interaction, such as when the problem causing the incident or alert has been identified and solved. The closing action to the aggregated incident report can be propagated backwards to the tenants 120 to modify the status of each individual SPRs 116. The closing propagation and/or status change multiplication may be performed by the processor 109 and/or 108.

In general, environment 100 depicts an example configuration of a system for authenticating the server 101 to the service provider cockpit server 151. For example, the service provider cockpit server 151 can receive and process incident reports (e.g., bulk alert message 145) from the server 101. The server 101 can include multiple tenants 120 that are remotely connected to the server 101, as well as a system tenant 130 that can support and handle the multiple tenants 120. The environment 100 is an example, and in alternative implementations, the elements illustrated in FIG. 1 may be included in or associated with different and/or additional servers, tenants, networks, and locations other than those as shown. For example, there may be additional tenants, such as multiple tenants connected to one or more application systems similar to the service provider cockpit server 151 to obtain various functionalities and services. That is, one or more of the components illustrated within the service provider cockpit server 151, the server 101, or any of the other illustrated components, may be located in multiple or different servers, cloud-based networks, or other locations accessible to the service provider cockpit server 151 (e.g., either directly or indirectly via network 148).

At a high level, the service provider cockpit server 151 can be commercially coupled with or otherwise connected to one or more system tenants, such as those at server 101. For example, the service provider cockpit server 151 can receive bulk alert messages 145, as well as individual messages, from the server 101. The bulk alert messages 145 and individual messages can include software problem reports (SPRs) across the multiple tenants 120 in the server 101. Each of the tenants 120 can include at least a health check engine 121 and a software problem report generator 122. The health check engine 121 examines the tenants 120 and recognizes/flags/identifies events in each tenant. The software problem report generator 122 can generate SPRs 116 to be stored in the database 111. The SPRs 116 can be aggregated and correlated at the system tenant 130, which includes at least an aggregation engine 133, a health check module 132, and an alert message collector 136. The service provider cockpit server 151 can receive and handle the bulk alert messages 145. The service provider cockpit server 151 includes at least an aggregation engine 129 and an incident viewer 127. The incident viewer 127 can allow users to remotely view and interact with incidents reported in the bulk alert messages 145 and additional individual alert message 146 details of the incident report management are described below.

In the illustrated implementation of FIG. 1, the service provider cockpit server 151 includes an interface 106, a processor 109, a memory 112, the incident viewer 127, and the aggregation engine 129. In some instances, the service provider cockpit server 151 and its illustrated components may be separated into multiple components executing at different servers and/or systems. For example, while FIG. 1 illustrates the incident viewer 127 and the aggregation engine 129 as separate components, other example implementations can include the aggregation engine 129 within a separate system, as well as within as part of the incident viewer 127's inherent functionality. Thus, while illustrated as a single component in the example environment 100 of FIG. 1, alternative implementations may illustrate the service provider cockpit server 151 as including multiple parts or portions, accordingly.

The interface 106 is used by the service provider cockpit server 151 to communicate with other systems in a client-server or other distributed environment (including within environment 100) connected to the network 148 (e.g., the server 101, as well as other systems communicably coupled to the network 148). The interface 106 generally includes logic encoded in software and/or hardware in a suitable combination and operable to communicate with the network 148. More specifically, the interface 106 or 105 may include software supporting one or more communication protocols associated with communications such that the network 148 or the interface's hardware is operable to communicate physical signals within and outside of the illustrated environment 100. The inbound alert message handler 107 can temporarily store and accumulate both individual alert messages 146 and bulk alert messages 145 sent via the network 148. In some implementations, the inbound alert message handler 107 operates closely with the memory 112 and the aggregation engine 129 in determining when the individual alert message 146 and the bulk alert message 145 are ready to be processed. The inbound alert message handler 107 can also associate the individual alert messages 146 and the bulk alert message 145 with other information preexisting in the memory 112, such as the tenant information 117, or information in the incident database 119 or the message database 143.

The processor 109 can be any appropriate processing unit or units to enable computation in the service provider cockpit server 151. Although illustrated as a single processor 109 in the service provider cockpit server 151, two or more processors may be used in the service provider cockpit server 151 according to particular needs, desires, or particular embodiments of environment 100. The processor 109 may be a central processing unit (CPU), a blade, an application specific integrated circuit (ASIC), a field-programmable gate array (FPGA), or another suitable component. Generally, the processor 109 executes instructions and manipulates data to perform the operations of the service provider cockpit server 151 and, specifically, the functionality associated with the corresponding incident viewer 127 and the aggregation engine 129. In one implementation, the server's processor 109 executes the functionality required to receive inbound communications from and send outbound communications to the server 101, as well as the functionality required to perform the operations of the associated incident viewer 127 and the aggregation engine 129, among others.

The memory 112 of the illustrated service provider cockpit server 151 stores at least tenant information 117, an incident database 119, and a message database 143. The memory 112 may include any memory or database module and may take the form of volatile or non-volatile memory including, without limitation, magnetic media, optical media, random access memory (RAM), read-only memory (ROM), removable media, or any other suitable local or remote memory component. The memory 112 may store various objects, object models, and data, including classes, frameworks, applications, backup data, business objects, jobs, web pages, web page templates, database tables, process contexts, repositories storing services local to the service provider cockpit server 151, and any other appropriate information including any parameters, variables, algorithms, instructions, rules, constraints, or references thereto associated with the purposes of the service provider cockpit server 151 and its functionality. In some implementations, including a cloud-based system, some or all of the memory 112 may be stored remote from, but communicably coupled to, the service provider cockpit server 151 for usage. Some or all of the elements illustrated within memory 112 may be stored external to the memory 112. These items are made accessible to the incident viewer 127 and the aggregation engine 129.

The tenant information 117 can support the incident viewer 127 by providing corresponding tenant information associated with each incident report. The incident database 119 includes preexisting incident reports from previous aggregation and processing. The message database 143 includes previous inbound alert messages, and can be used to identify similar new messages to those received before. The incident database 119 and the message database 143 can include any appropriate forms of data, metadata, and other data types in support for the incident viewer 127. For example, the incident database 119 and the message database 143 can include files for running operation systems or programs, files generated in the operation systems, files produced by users, and other types of data. The tenant information 117 can be recorded and generated in the service provider cockpit server 151 based on information provided at the server 101. For example, the tenant information 117 can be associated with the files in the incident database 119 and the message database 143 generated in the aggregation engine 129.

At a high level, the incident viewer 127 can be any application, program, module, process, or other software that may execute, change, delete, generate, or otherwise manage information associated with a particular service provider cockpit server 151. In particular, the incident viewer 127 may be associated with one or more business processes that communicate with other users, applications, systems, and components to send, receive, and process events. In some instances, a particular incident viewer 127 may operate in response to and in connection with one or more requests received from an associated server 101 or other remote client. Additionally, a particular incident viewer 127 may operate in response to and/or in connection with one or more requests received from other applications external to the service provider cockpit server 151. In some instances, the incident viewer 127 may request additional processing or information from an external system or application. In some instances, one or more of the applications may represent a web-based application accessed and be executed by remote users via the network 148 (e.g., through the Internet, or via one or more cloud-based services associated with the incident viewer 127). Further, while illustrated as internal to the service provider cockpit server 151, one or more processes associated with a particular incident viewer 127 may be stored, referenced, or executed remotely. For example, a portion of a particular incident viewer 127 may be a web service that is remotely called, while another portion of the incident viewer 127 may be an interface object or agent bundled for processing at a remote system (not illustrated), or a particular server 101 (e.g., the tenants 120). Moreover, any or all of a particular incident viewer 127 may be a child or sub-module of another software module or enterprise application (not illustrated) without departing from the scope of this disclosure. Still further, portions of the particular incident viewer 127 may be executed or accessed by a user working directly at the service provider cockpit server 151, as well as remotely at a corresponding server 101.

The incident viewer 127 can enable users to interact with the summarized incident reports and alert information. In some implementations, users can be provided instructions and solutions via the incident viewer 127 to resolve issues described in the alerts sent in the bulk alert message 145 and other individual alert messages 146. The incident viewer 127 can be displayed on a graphic user interface (GUI). For example, the GUI associated with the incident viewer 127 includes a graphical user interface operable to allow the incident viewer 127 to interface with at least a portion of the memory 112, and/or the associated operations and functionality. The GUI may include a plurality of customizable frames or views having interactive fields, pull-down lists, and buttons operated by the user. For example, the GUI may provide interactive elements that allow a user to interact with a particular component within and/or external to environment 100. Different portions of the corresponding component's functionality may be presented and accessible to the user through the GUI. Generally, the GUI may also provide general interactive elements that allow a user to access and utilize various services and functions of a particular component. The GUI may present the information of the memory 112 for viewing and interaction. In general, the GUI is often configurable, supports a combination of tables and graphs (bar, line, pie, status dials, etc.), and is able to build real-time portals, where tabs are delineated by key characteristics (e.g., site or microsite). Therefore, the GUI contemplates any suitable graphical user interface, such as a combination of a generic web browser, intelligent engine, and command line interface (CLI) that processes information in the platform and efficiently presents the results to the user visually.

In some embodiments, the aggregation engine 129 aggregates incoming incident reports and generates a summarized incident report by reducing duplicates using correlation techniques. For example, the correlation techniques can include correlation of inbound incident reports of bulk alert messages 145 and/or individual alert messages 146 with the tenant information 117, the incident database 119, and the message database 143. Alerts may be correlated for a system by calculating a key field ratio, a system ID (SID), or a system number. In some implementations, the correlation process can use key fields of alerts of the incident messages to create a correlation key, such as using the formula:

KeyField1'=HASH(SID, KeyField1). The inbound alert messages can be correlated with preexisting incident reports stored in the message database 143 or the incident database 119, if they exist, to identify any known or previously received alerts and corresponding solutions. The aggregation engine 129 can generate a summarized incident report and present the summarized incident report using the incident viewer 127. In some implementations, the aggregation engine 129 can include an alert correlation module 128 for specifically handling correlation tasks. The alert correlation module 128 can perform correlation calculations for identifying duplicate alerts, as well as preexisting alerts. [Paused]

In some implementations, the alert correlation module 128 may use correlation algorithms in correspondence to specific algorithms and implementations of the health check engines 121 or health check module 132 that generate initial alert messages or error reports in the aggregation process. For example, the initial SPRs 116 generated by the health check engine 121 can determine the subsequent correlation algorithms used at the alert correlation module 128 of the aggregation engine 129. In general, the aggregation engine 129 can aggregate events, error reports, failures, and other forms of content of the SPRs 116. The contents of the SPRs 116 may be provided spontaneously within a system or generated by regularly executed check sessions run by the health check engines 121. In some instances of aggregation at the aggregation engine 129, the source events associated with the SPR 116 can include or be defined by a set of administration data, where the set of administrative data can be used to differentiate one source from another. The administration data may include information associated with system name(s), user space/tenant, health check group, health check ID, and other relevant information. By using a consolidation algorithm, the data identifying the source of an SPR event can aggregate the SPRs 116 of the same source into a single incident report.

In some implementations, health check procedures examining the contents of the SPR 116 can include checking procedures that differentiate between good and bad (e.g., corrupted) objects and/or entities or that differentiate between different problems of the same object/entity. The checking procedures can return either the ID of bad objects or a key value that identifies the type of inconsistency. A further level of aggregation can be performed using an algorithm employing the data generated by the checking procedure: SPRs 116 of the same source and the same object can be aggregated into the same incident, or objects of the same inconsistency can be aggregated into one incident. In this aggregation implementation, more incident reports with a higher quality of differentiation may be generated than the incident reports generated using a consolidation algorithm. The aggregation performed in the aggregation engine 129 can aggregate events with attributes (e.g., correlation keys 118) having the same value. The health checking implementation by the health check engine 121 has provided a foundation for this type of aggregation operation. In other implementations, the aggregation engine 129 can use the alert correlation module 128 to consolidate events from different sources, different objects and other information and criteria as additional knowledge about the structure of the software of the installation environment is available.

For example, object A can be a sub-object of object B. If A is inconsistent, then B may also be inconsistent. This can allow an event associated with object A to be consolidated with an event associated with object B. In another example, object A may be a shared component used by object B and object C. If B and C are generating complaint reports of the unavailability of their shared component object A, then an event associated with the object B and an event associated with the object C can be consolidated into an event associated with the object A. The additional information used in these correlation examples may be brought into the alert correlation module 128 by using predetermined codes in an inflexible manner, by manually creating configuration data for better performance, or by using a self-learning knowledge database, among other appropriate techniques. For example, a self-learning knowledge database can employ automatic scanning of a flow of events to capture common patterns of event sequences to determine features of the scanned event. If a common sequence is identified, the complete sequence may be consolidated into one incident in the future. These correlation techniques can be applied to single correlation engines, as well as multiple engines for large systems.

For example, a correlation engine within a productive system aggregates all events originating from the tenants of the current system. Problems of shared components used by the local tenants can then be consolidated. If the components are shared between different systems, additional correlation engines may be installed on a central administration system for collecting the correlated events of each local system and correlating the results again across all systems. This scheme may also employ a self-learning knowledge base to improve efficiency.

In general, the service provider cockpit server 151 can be any server or system that stores, manages, and executes functionality associated with the incident viewer 127 and the aggregation engine 129. Additionally, the service provider cockpit server 151 may execute one or more incident viewers 127. For example, each service provider cockpit server 151 may be a Java® 2 Platform, Enterprise Edition (J2EE)-compliant application server that includes Java® technologies such as Enterprise JavaBeans® (EJB), J2EE Connector Architecture (JCA), Java® Messaging Service (JMS), Java® Naming and Directory Interface (JNDI), and Java® Database Connectivity (JDBC). In other implementations, each service provider cockpit server 151 may be a platform using ABAP (i.e., Advanced Business Application Programing). In some instances, each service provider cockpit server 151 may store a plurality of various applications; while in other instances, the service provider cockpit server 151 may be a dedicated server meant to store and execute the aggregation engine 129 for a particular platform or application and its related functionality. In some instances, the service provider cockpit server 151 may include a web server or be communicably coupled with a web server, where one or more of the incident viewers 127 associated with the service provider cockpit server 151 represent web-based (or web-accessible) applications accessed and executed through requests and interactions received by the server 101, executing aggregation engines 129 operable to interact with the programmed tasks or one or more incident viewers 127.

The service provider cockpit server 151 can include an electronic computing device operable to receive, transmit, process, store, or manage data and information associated with the environment 100. The service provider cockpit server 151 illustrated in FIG. 1 can be responsible for receiving application-related requests from one or more tenants 120 (as well as any other entity or system interacting with the service provider cockpit server 151, including desktop or mobile client systems), responding to the received requests by processing said requests in the associated incident viewer 127, and sending the appropriate responses from the appropriate component back to the server 101 or other requesting system. Accordingly, in addition to requests from the server 101 illustrated in FIG. 1, requests associated with a particular component may also be sent from internal and/or external users, external or third-party customers, and other associated business applications, business processes, as well as any other appropriate entities, individuals, systems, or computers. In some instances, the incident viewer 127 may be web-based applications executing functionality associated with a networked or cloud-based business process.

Referring now to the server 101 illustrated in FIG. 1, the server 101 may be any computing device operable to connect to and/or communicate with the service provider cockpit server 151 using a wireline or wireless connection directly or via the network 148, or another suitable communication means or channel. In some instances, the server 101 may be a part of or associated with a business process involving one or more remote developers or users associated with the incident viewer 127. It will be understood that there may be any number of servers associated with, or external to, environment 100. For example, while illustrated environment 100 includes a server 101, alternative implementations of environment 100 may include multiple servers communicably coupled to one or more of the systems illustrated. In some instances, one or more servers 101 may be associated with administrators of the environment, where the administration allowed to access interact with the settings and operations of the aggregation engine 129, one or more incident viewers 127, and/or other components of the illustrated environment 100. Additionally, there may also be one or more additional servers 101 external to the illustrated portion of environment 100 capable of interacting with the environment 100 via the network 148.

The server 101 includes at least an interface 105, an outbound alert message handler 103, a processor 108, a database 111, the tenants 120, and the system tenant 130. Some of the components of the server 101 are similar and comparable to the components of the service provider cockpit server 151. For example, the outbound alert message handler 103 can be comparable to, but functions differently from, the inbound alert message handler 107. The outbound alert message handler 103 can temporarily buffer the bulk alert message 145 and operate with the interface 105. The outbound alert message handler 103 can also send individual alert messages 146 as appropriate where correlations are not occurring at the service provider cockpit server 151. Similar to the processor 109, the processor 108 performs analysis and data extraction related to the tenants 120 and the system tenant 130 as well as the operations as needed. Although illustrated as a single processor 108, two or more processors may be used according to particular needs, desires, or particular embodiments of environment 100. Similar to the processor 109, the processor 108 may be a central processing unit (CPU), a blade, an application specific integrated circuit (ASIC), a field-programmable gate array (FPGA), or another suitable component. Generally, the processor 108 executes instructions and manipulates data to perform the operations of the server 101 and, specifically, the functionality associated with the tenants 120.

The tenants 120 can be any appropriate computer systems associated with software and functionalities provided by the software. In some implementations, the tenant 120 may represent one or more virtual system coexisting and sharing resources on a single server 101 in a virtualized manner. During operation, the software may encounter various problems that affect the performance of the tenants 120. The health check engine 121 can monitor the tenants 120 and detect or identify the problems of the software. The detected problems can trigger the software problem report generator 122 to generate an SPR 116. In some implementations, the SPR 116 can include multiple alerts related to multiple software instances. The generated SPRs 116 can be stored at the database 111 and accessed by the system tenant 130. For example, the tenants 120 can include tens of thousands of business applications generating tens of thousands of alerts. Some of the alerts may be duplicates or the same or related alerts, for the same business application running at different tenants. Each tenant generates an SPR and the SPRs 116 of all tenants can be temporarily stored at the database 111. In some implementations, the SPRs 116 can be processed at the system tenant 130 for generating and optimizing the bulk alert message 145. In some implementations, the SPRs 116 can be sent as the bulk alert message 145 and be processed at the service provider cockpit server 151. In other instances, SPRs 116 may be generated and sent individually to the service provider cockpit server 151.

As illustrated, the system tenant 130 includes the health check module 132, the aggregation engine 133, and the alert messages collector 136. The health check module 132 can monitor, detect, and/or, identify alerts and problems associated with the system tenant 130, similar to the health check engine 121 of the tenants 120. If any alert or problem is identified, the incidents may be aggregated along with SPRs 116 from the tenants 120, or sent individually to the service provider cockpit system 151. The aggregation engine 133 can aggregate SPRs 116 that may include duplicate or redundant incident reports for some or all of the tenants 120, where aggregation is being performed at the server 101. For example, the aggregation engine 133 may generate correlation keys 118 for alerts of the SPRs 116 and aggregate the SPRs 116 into the bulk alert message 145, where appropriate. The SPRs 116 may be buffered and collected at or by the alert messages collector 136 before being processed by the aggregation engine 133. The alert message collector 136 may extract certain information from the alerts stored in the SPRs 116. For example, the extracted information can include alert classification fields of at least one of check group, check ID, event key, or key fields. The aggregation engine 133 can aggregate the alert messages into a small file size format for efficient computation, resulting in the bulk alert messages 145 being optimized for size and performance.

The database 111 of the server 101 stores SPRs 116, correlation keys 118, as well as data and program instructions, and data associated with SPRs, alert messages, and other incident events. In some implementations, correlation keys related to the aggregation engine 129 can also be created and stored at the memory 112 of service provider cockpit server 151. Alternatively, the correlation keys 118 may be generated and stored at the service provider cockpit server 151 and not at the server 101. The database 111 can be functionally and structurally similar to the memory 112. The database 111 may include any memory or database module and may take the form of volatile or non-volatile memory including, without limitation, magnetic media, optical media, random access memory (RAM), read-only memory (ROM), removable media, or any other suitable local or remote memory component. The database 111 may store various objects, object models, and data, including classes, frameworks, applications, backup data, business objects, jobs, web pages, web page templates, database tables, process contexts, repositories storing services local to the server 101, and any other appropriate information including any parameters, variables, algorithms, instructions, rules, constraints, or references thereto associated with the server 101 and its functionality. In some implementations, including a cloud-based system, some or all of the database 111 may be stored remote from the server 101, and communicably coupled to the server 101 for usage. Some or all of the elements may be stored external to the database 111, for example, in an internet-based storage location.

While both the server 101 and the service provider cockpit server 151 include individual aggregation engines 133 and 129 in FIG. 1, other configurations may be possible. In some implementations, the server 101 can handle the aggregation process at the system tenant 130 such that the aggregation engine 129 may not be required at the service provider cockpit server 151. For example, the SPRs 116 of the tenants 120 can be aggregated at the system tenant 130, which generates a summarized incident report included in the bulk alert message 145. The summarized incident report included in the bulk alert message 145 can be directly used by the incident viewer 127 of the service provider cockpit server 151. The transmission of the bulk alert message 145 can therefore substantially save network traffic. In some other implementations, the service provider cockpit server 151 can handle major aggregation processes and the aggregation engine 133 may not be required at the system tenant 130. For example, the SPRs 116 can be sent directly from the outbound alert message handler 103, either individually or as the bulk alert messages 145, to the service provider cockpit server 151. The service provider cockpit server 151 can temporarily save the individual alert messages 146 and/or bulk alert messages 145 at the inbound alert message handler 107, and further process the alert messages at the aggregation engine 129. The aggregation engine 129 may correlate the alert messages with existing information in the memory 112 (e.g., the tenant information 117, the incident database 119, and the message database 143 as well as locally stored correlation keys) to generate a summarized incident report. Such implementations can be advantageous as less information manipulation and reduction occurs before aggregation with existing information at the backend, resulting in a more accurate summarized incident report and a more complete set of information existing at the service provider cockpit server 151.

As used in this disclosure, the server 101 is intended to encompass a personal computer, touch screen terminal, workstation, network computer, kiosk, wireless data port, smart phone, personal data assistant (PDA), one or more processors within these or other devices, or any other suitable processing device. For example, each server 101 may include a computer that includes an input device, such as a keypad, touch screen, mouse, or other device that can accept user information, and an output device that conveys information associated with the operation of one or more client applications, and/or the server 101 itself, including digital data, visual information, or the GUI. Both the input and output device may include fixed or removable storage media such as a magnetic storage media, CD-ROM, or other suitable media, to both receive input from and provide output to users of server 101 through the display, namely, the GUI. The client's processor 108, interface 105, and database 111 may be similar to or different from those described in connection with the other components illustrated in FIG. 1, although alternative implementations of one or more of these components may be used, as well as implementations where additional components may also be included. Each tenant 120 can be a single instance of software running on a server, serving multiple client organizations (e.g., tenants). The tenants 120 can be part of a multi-tenancy software architecture. In general, separate software instances or hardware system can be set up for different client organizations. With a multitenant architecture, a software application can be designed to virtually partition its data and configuration, and each client organization works with a customized virtual application instance.

FIG. 1 depicts a server-client environment, but could also represent a cloud computing network. Various other implementations of the illustrated environment 100 can be provided to allow for increased flexibility in the underlying system, including multiple service provider cockpits 151 performing or executing one or more additional or alternative instances of the aggregation engine 129 for one or more different platforms, as well as multiple instances of the incident viewer 127 and its related functionality. In those instances, the different service provider cockpits 151 may communicate with each other via a cloud-based network or through the connections provided by network 148. Generally, the service provider cockpit server 151 may be communicably coupled with the network 148 that facilitates wireless or wireline communications between the components of the environment 100 (i.e., between the service provider cockpit server 151 and one or more tenants 120), as well as with any other local or remote computer, such as additional tenants, servers, or other devices communicably coupled to the network 148, including those not illustrated in FIG. 1. In the illustrated environment, the network 148 is depicted as a single network, but may be included in more than one network without departing from the scope of this disclosure, so long as at least a portion of the network 148 may facilitate communications between senders and recipients. In some instances, one or more of the components associated with the service provider cockpit server 151 may be included within the network 148 as one or more cloud-based services or operations.

The network 148 may be all or a portion of an enterprise or secured network, while in another instance, at least a portion of the network 148 may represent a connection to the Internet. In the illustrated example, at least a portion of the network 148 includes a portion of a cellular or mobile data network or other network capable of relaying SMS messages. In some instances, a portion of the network 148 may be a virtual private network (VPN). Further, all or a portion of the network 148 can include either a wireline or wireless link. Example wireless links may include 802.11/b/g/n, 802.20, WiMax®, and/or any other appropriate wireless link. In other words, the network 148 encompasses any internal or external network, networks, sub-network, or combination thereof operable to facilitate communications between various computing components inside and outside the illustrated environment 100. The network 148 may communicate with, for example, Internet Protocol (IP) packets, Frame Relay frames, Asynchronous Transfer Mode (ATM) cells, voice, video, data, and other suitable information between network addresses. The network 148 may also include one or more local area networks (LANs), radio access networks (RANs), metropolitan area networks (MANs), wide area networks (WANs), all or a portion of the Internet, and/or any other communication system or systems at one or more locations.

As used in this present disclosure, the term "computer" is intended to encompass any suitable processing device. For example, although FIG. 1 illustrates a single service provider cockpit server 151, environment 100 can be implemented using any number of servers, as well as computers other than servers, including a server pool. Indeed, the service provider cockpit server 151 may be any computer or processing device such as, for example, a blade server, general-purpose personal computer (PC), Macintosh®, workstation, UNIX®-based workstation, or any other suitable device. In other words, the present disclosure contemplates computers other than general purpose computers, as well as computers without conventional operating systems. Further, the illustrated service provider cockpit server 151 may be adapted to execute any operating system, including Linux®, UNIX®, Windows®, Mac® OS, iOS, or any other suitable operating system.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java®, Visual Basic®, assembler, Perl®, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, each processor 109 executes the corresponding aggregation engine 129 and the incident viewer 127 stored on the associated service provider cockpit server 151. In some instances, a particular service provider cockpit server 151 may be associated with the execution of two or more incident viewers 127 (and other related components), as well as one or more distributed applications executing across two or more servers executing the functionality associated with the service provider cockpit server 151.

As illustrated in FIG. 1, the aggregation of SPRs or alert messages may occur at the server 101, or the service provider cockpit server 151, or both. The configuration can depend on a system preference for advantages brought with each setting. For example, the aggregation and incident report reduction can be solely performed at the system tenant 130 by the aggregation engine 133, where alert messages can be aggregated and optimized for transmission size and/or performance. The aggregation of SPRs 116 can also be solely performed at the service provider cockpit server 151 by the aggregation engine 129. In this configuration, less information loss of the SPRs 116 will result and a more accurate aggregation process can take place than the previous configuration. In some other implementations, advantages of both configurations can be combined by performing a two stage aggregation at both the server 101 and the service provider cockpit server 151 for increased transmission efficiency, as well as aggregation accuracy.

Figure 2:
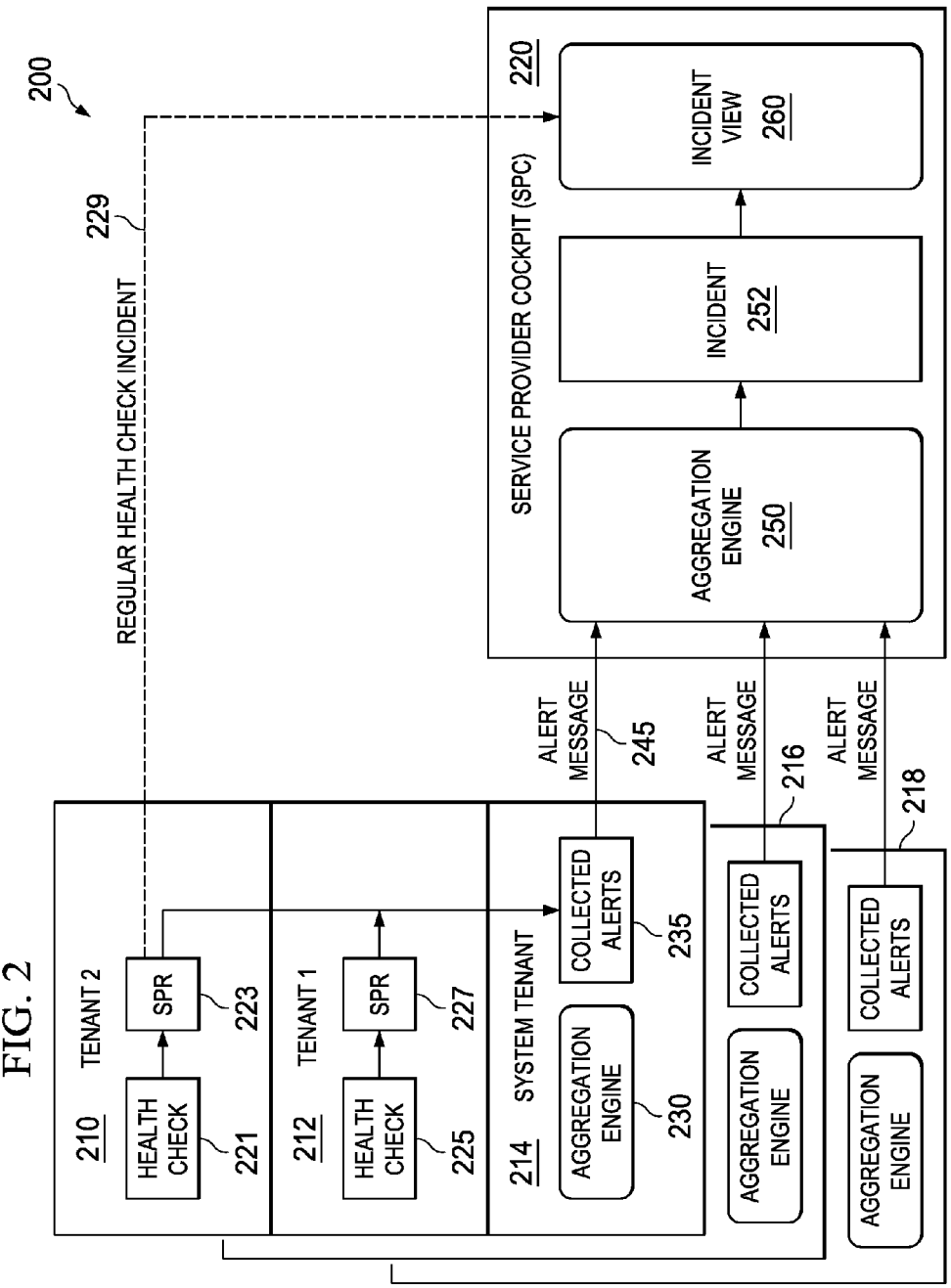
FIG. 2 illustrates an example environment of managing incident reports.

FIG. 2 illustrates an example environment 200 of managing incident reports. The example environment 200 can be one implementation of the environment 100 as illustrated in FIG. 1. At a high level, the environment 200 includes multiple system tenants 214, 216, and 218 in a plurality of servers, as well as a service provider cockpit 220. Each of the system tenants 214, 216, and 218 can be similar to the system tenant 130 of the server 101 of FIG. 1. For example, the illustrated system tenant 214 is communicably connected with two example tenants 210 and 212. Each of the example tenants 210 and 212 can be similar to the tenants 120 of FIG. 1. The tenants 210, 212 include a health check module 221, 225 and an SPR generator 223, 227, respectively. The SPRs generated from these two tenants 210 and 212 can first be collected at the alert collector 235 where appropriate, which is similar to the alert message collector 136 of FIG. 1. In some implementations, the SPRs may be sent as individual alert messages without undergoing the collection process at the alert collector 235. The collected SPRs can then be processed at the aggregation engine 230 of the system tenant 214. The aggregation engine 230 can be similar to the aggregation engine 133 of FIG. 1, where duplicate alerts can be identified and grouped for the summarized incident report sent with the bulk alert messages 145. The alert messages 245 are sent from the system tenants 214, 216, and 218 to the service provider cockpit 220. In some implementations, the service provider cockpit 220 can directly receive health check incidents from tenants without same aggregation at the servers, such as the tenants 210 or 212, for example.

The service provider cockpit 220 includes at least the aggregation engine 250, a summarized incident report generator 252, and an incident viewer 260. The incoming alert messages 245 can first be collected and gathered at the aggregation engine 250. The alert messages 245 can be received directly from the alert collector 235 or from the aggregation engine 230, which in some instances can initially perform an aggregation process to reduce network traffic. The aggregation engine 250 can correlate among the incoming alert messages 245 and correlate the alert messages 245 with any preexisting information or related alerts to generate a summarized incident report at the report generator 252. The summarized incident report can then be provided to the incident viewer 260 upon request to enable users to view and interact with the aggregated alerts and/or incidents of the tenants 210 and 212. The environment 200 is one instance of the environment 100 when there multiple system tenants and multiple tenants interconnected. When the number of tenants increases, the illustrated environment 200 can effectively and efficiently reduce duplicate or redundant alert messages, therefore operation efficiency can be increased and response time can be reduced.

Figure 3:
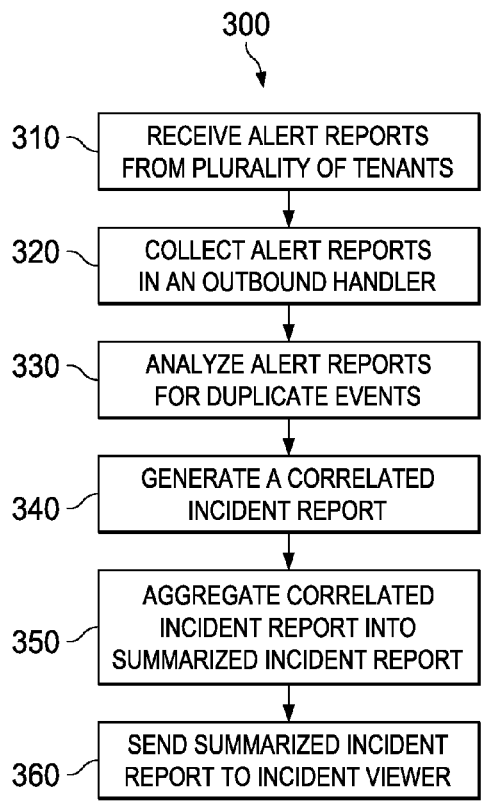
FIG. 3 illustrates an example method for managing incident reports from the perspective of a server.

FIG. 3 illustrates an example method 300 for managing incident reports from the perspective of a server. The method 300 can be applied to a system environment, such as the environment 100 of FIG. 1. At 310, alert reports are received from a plurality of tenants. For example, software of various tenant systems can be checked for potential alerts or problems (e.g., using corresponding health check engines). The identified alerts or problems can be reported in software problem reports (SPRs). The SPRs or a collection of SPRs can be alert reports. Each SPR or alert report can include alert classification fields of at least one of check group, check ID, event key, or key fields. For example, a health check engine of each tenant can identify a set of administrative data that includes information associated with system name(s), user space/tenant, health check group, health check ID, and other relevant information. For aggregation purposes, these key fields can enable differentiation one source from another. In some instances, a basic consolidation algorithm can aggregate across these data that identifying the source of the event.

At 320, the generated alert reports or SPRs can be collected in an outbound handler. The outbound handler can monitor the accumulated alert reports or SPRs and trigger a process when the SPRs reach a threshold value. At 330, the alert reports can be analyzed for duplicate events. For example, a correlation algorithm can be used to identify duplicate or similar alert messages. The correlation algorithm can be associated with the algorithms detecting events, error reports, failures, or other contents in a health check engine. The correlation algorithm may consolidate data based on the source of the event, or to group data from the same source and of the same object together. This may be realized by generating a hash code corresponding to each of multiple alert reports, and comparing each of the generated hash codes to the other hash codes as well as previously generated hash codes associated with previously received alert reports to identify duplicate alert reports having similar hash codes. In some implementations, the correlation algorithm includes calculating correlation keys using hash functions. The correlation keys can identify the source, object type, or other feature parameters identified using the correlation algorithm. For example, the correlation keys can correspond to at least one generated hash code of a particular alert report by identifying a common correlation key for at least two alert reports and associating the alert reports having the common correlation key with a correlated incident report.

At 340, a correlated incident report is generated, for example, from using the correlation process at 330. The correlated incident report can be optimized for transmission size and/or process performance. For example, the correlated incident report reduces the overall file size by removing duplicate/redundant alert messages or by consolidating similar content into fewer entries, therefore reducing transmission and computation workload. In some implementations, the correlated incident report can identify the number of similar or duplicate alert messages among the SPRs. The correlated incident report can group SPRs based on content, context, and/or alert messages in the SPRs. In some implementations, health check procedures examining the contents of the SPR can include checking procedures that differentiate between good and bad (e.g., corrupted) objects/entities or that differentiate between different problems of the same object/entity. The checking procedures can return either the ID of bad objects or a key value that identifies the type of inconsistency.

At 350, the correlated incident report can be aggregated into a summarized incident report, for example, at an aggregation engine. The aggregation engine can perform initial aggregation at a system tenant. In some implementations, an aggregation engine can operate remotely from a service provider cockpit. The summarized incident report reduces the number of duplicate or similar alert messages to be processed. In some implementations, multi-step aggregation processes can be used. For example, an initial aggregation process can be applied at the system tenant where the correlated incident report is generated. A second aggregation process involving preexisting information can be performed later at a remote or centralized service provider cockpit. In some instances, aggregation may only occur at the SPC. In some implementations, a further level of aggregation can be performed using an algorithm employing the data generated by the checking procedure: SPRs of the same source and the same object can be aggregated into the same incident; or objects of the same inconsistency can be aggregated into one incident. In this aggregation implementation, more incident reports with a higher quality of differentiation may be generated than the incident reports generated using a consolidation algorithm. The aggregation performed in the aggregation engine can aggregate events with attributes (e.g., correlation keys) having the same value. The health checking implementation by the health check engine has provided a foundation for this type of aggregation operation. In other implementations, the aggregation engine can use the alert correlation module to consolidate events from different sources, different objects and other features/criteria as additional knowledge about the structure of the software of the installation environment is available.

Figure 6:
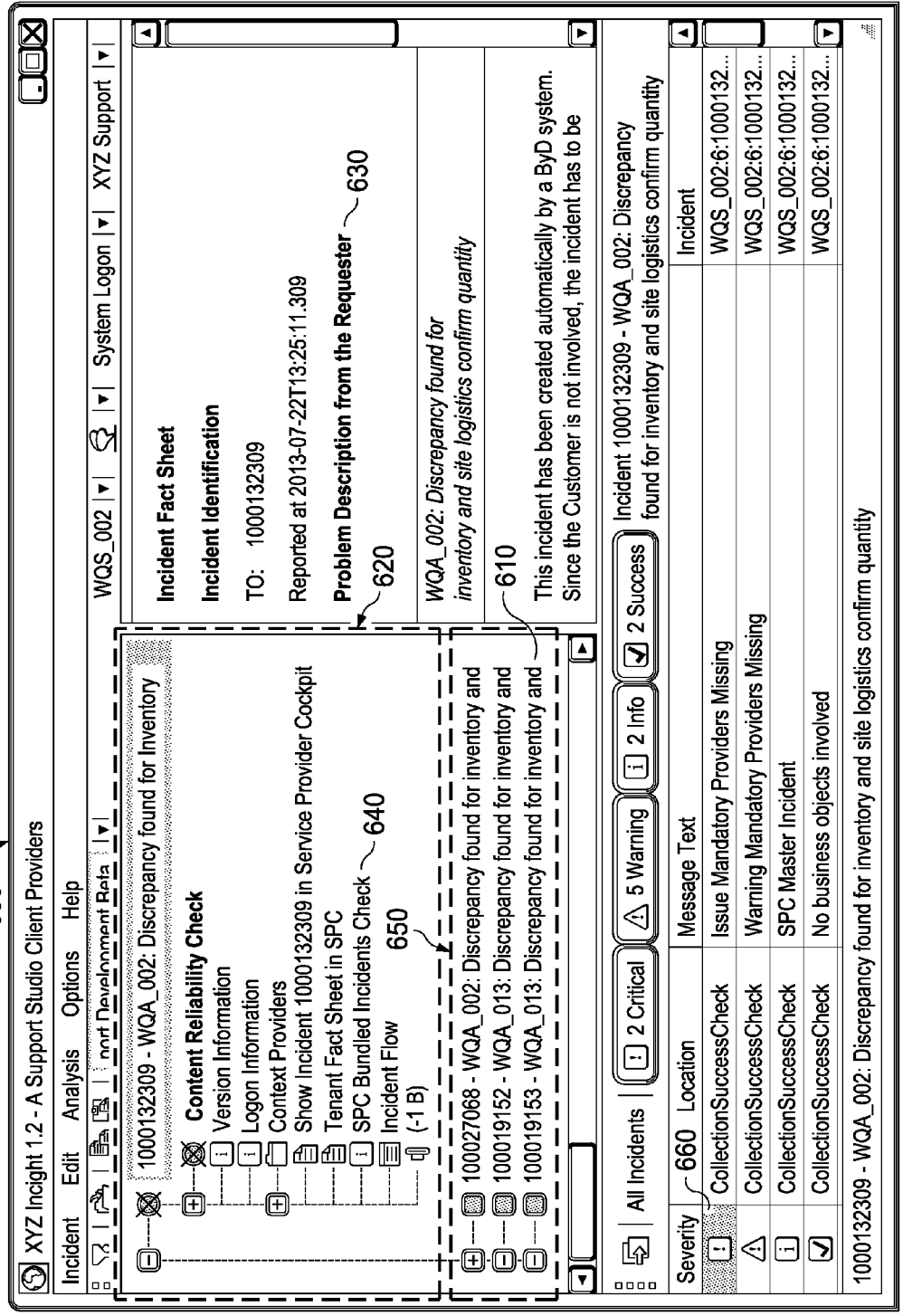
FIG. 6 illustrates an example user interface of an incident viewer.

At 360, the summarized incident report is sent to an incident viewer that enables users to respond to and interact with each alert message. An example incident viewer user interface is illustrated in FIG. 6. In some implementations, the incident viewer can let users close, clear, or modify the status of the aggregated incident reports after interaction, such as when the problem causing the incident or alert has been identified and solved. The closing action or other status change action to the aggregated incident report can be propagated backwards to the plurality tenants from where the alert reports are collected.

Figure 4:
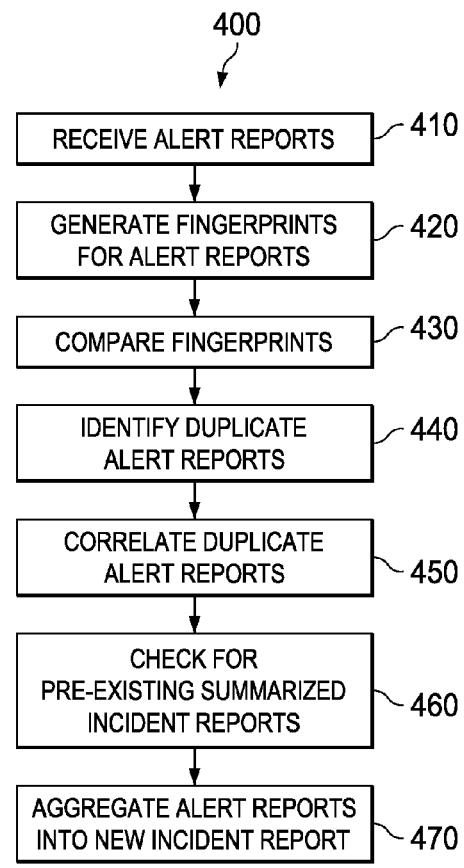
FIG. 4 illustrates an example method for incident report aggregation and correlation.

FIG. 4 illustrates an example method 400 for incident report aggregation and correlation. The method 400 can be applied to an aggregation engine, for example, such as the aggregation engines 129 and 133 of FIG. 1 at either the server associated with tenant or by a centralized/remote service provider cockpit server. At 410, alert reports are received, for example, at an aggregation engine. The alert reports can be SPRs generated at multiple tenants and system tenants (e.g., from events due to failures in systems). At 420, fingerprints are generated for each alert message in the alert reports. The fingerprint can represent key information of the alert message, and can be computed into a predetermined format for ease of comparison. The fingerprint can be calculated using any appropriate hashing algorithm. For example, the fingerprint can be a hash code generated in correspondence to each of the alert reports using various appropriate hashing algorithms. The hashing algorithms may be applied to certain common fields of the alert reports. At 430, the fingerprints of the alert reports are compared for duplicate and/or similar values. For example, each of the generated fingerprints (e.g., hash codes) is compared to other fingerprints of other alert reports, as well as previously-generated fingerprints associated with previously received alert reports, to identify duplicate alert reports having similar generated hash codes. At 440, duplicate alert reports are identified. For example, a difference threshold can be set with the fingerprints within the threshold being defined as duplicates.

At 450, duplicate alert reports are correlated. For example, alert reports containing duplicate alert messages can be grouped into a correlated incident report, to reduce the number of duplication alerts in the system. The correlation process can include identifying a correlation key that corresponds to at least one generated hash code of a particular alert report. For example, a common correlation key can be identified for at least two alert reports. At 460, preexisting summarized incident reports are checked to identify similarities between the correlated report and the preexisting summarized incident reports. If the correlated report matches a preexisting summarized incident report, the preexisting summarized incident report may be further correlated with the correlated report. For example, two alert reports having a common correlation key can be associated with a correlated incident report. At 470, a new summarized incident report is aggregated based on the correlated report and other alert reports. The new summarized incident report can reduce duplication to a minimum for the service provider to process. The user interacting with the incident viewer can also be informed with different alert messages without paying additional attention to duplicate alerts.

FIG. 5 illustrates an example user interface of a service provider cockpit UI 500. The service provider cockpit UI 500 provides details of errors found. For example, a window 510 of activation errors can be displayed, in details including status, priority, report time, check group, check ID, event key, among others. The window 510 can include a list of error information 520 that include details of affected tenants (although other information such as general information, recommended action, changes, attachments, categorization, and others may also be displayed). In the list of error information 520, a specific tenant 530 may be selected for further information shown at 540. Information of the tenant 530 displayed in the list 520 can include a tenant ID, SID, client, status, subject, and updated time, among other information. Further information at 540 can include customer name, tenant role, version number, and occurrence time, among other information.

FIG. 6 illustrates an example user interface of an incident viewer UI 600. The incident viewer UI 600 can provide additional details regarding a selected issue/alert, including at least a cockpit overview 620, a list 650 of alerts 610, a problem description 630, a bundled incident check 640, and a query table 660. A user may select the bundled incident check 640 in the cockpit overview 620 to open bundled incident views. The incidents may be displayed in the query table 660, showing at least severity, location, message, and incident code or the alerts. Selected incidents can have detailed description in the window of problem description 630. As illustrated in FIG. 6, incidents can be aggregated and shown in the incident viewer in a batch for improved processing efficiency.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different order than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method for managing system alert incidents, comprising:
   receiving, from a plurality of tenants in at least one multi-tenant system, a plurality of alert reports, each alert report representing at least one system alert incident associated with the plurality of tenants in the at least one multi-tenant systems;
   analyzing, by a hardware processor, the plurality of alert reports for duplicate alert reports, wherein analyzing the plurality of received alert reports includes:
      identifying duplicate alert reports, wherein identifying the duplicate alert reports comprises:
         generating a hash code corresponding to each of the plurality of alert reports; and
         comparing each of the generated hash codes with each of the other generated hash codes and previously-generated hash codes associated with previously received alert reports to identify duplicate alert reports having similar generated hash codes;
      correlating each duplicate alert report of the plurality of duplicate alert reports into a correlated incident report; and
      aggregating the correlated incident reports into at least one summarized incident report.

2. The method of claim 1, further comprising sending the at least one summarized incident report to a multi-tenant monitoring system for processing.

3. The method of claim 2, wherein correlating the plurality of alert reports comprises identifying a correlation key where the correlation key corresponds to at least one generated hash code of a particular alert report, the method further comprising:
   identifying a common correlation key for at least two alert reports; and
   associating the at least two alert reports having the common correlation key with a correlated incident report.

4. The method of claim 1, wherein the plurality of alert reports are received at a multi-tenant monitoring system, the method further comprising:
   identifying at least one preexisting summarized incident report at the multi-tenant monitoring system; and
   comparing the at least one summarized incident report with the at least one preexisting summarized incident reports.

5. The method of claim 1, further comprising:
   collecting, at a system tenant of a particular multi-tenant system, the plurality of alert reports associated with a particular multi-tenant system prior to analyzing the plurality of alert reports from the single multitenant system.

6. The method of claim 1, wherein the plurality of alert reports comprises system problem reports (SPR).

7. The method of claim 6, wherein each alert report of the plurality of alert reports is generated in a corresponding tenant of a multi-tenant system.

8. The method of claim 6, wherein each alert reports comprises alert classification fields of at least one of check group, check ID, event key, or key fields.

9. The method of claim 1, wherein the received alert reports are received from at least a first multi-tenant system and a second multi-tenant system different than the first multi-tenant system.

10. A tangible, non-transitory computer readable medium encoded with a computer program, the program comprising instructions that when executed by one or more hardware processors cause the one or more hardware processors to perform operations for authenticating an end user comprising:
    receiving, from a plurality of tenants in at least one multi-tenant system, a plurality of alert reports, each alert report representing at least one system alert incident associated with the plurality of tenants in the at least one multi-tenant systems;
    analyzing the plurality of alert reports for duplicate alert reports, wherein analyzing the plurality of received alert reports includes:
       identifying duplicate alert reports, wherein identifying the duplicate alert reports comprises:
          generating a hash code corresponding to each of the plurality of alert reports; and
          comparing each of the generated hash codes with each of the other generated hash codes and previously-generated hash codes associated with previously received alert reports to identify duplicate alert reports having similar generated hash codes;
       correlating each duplicate alert report of the plurality of duplicate alert reports into a correlated incident report; and
       aggregating the correlated incident reports into at least one summarized incident report.

11. The computer readable medium with the computer program of claim 10, further comprising instructions that when executed by one or more computers cause the one or more computers to perform operations comprising sending the at least one summarized incident report to a multi-tenant monitoring system for processing.

12. The computer readable medium with the computer program of claim 10, wherein correlating the plurality of alert reports comprises defining a correlation key, where the correlation key corresponds to at least one generated hash code of a particular alert report, the operations further comprising:
   identifying a common correlation key for at least two alert reports; and
   associating the at least two alert reports having the common correlation key with a correlated incident report.

13. The computer readable medium with the computer program of claim 10, further comprising instructions that when executed by one or more computers cause the one or more computers to perform operations comprising collecting, at a system tenant of a particular multi-tenant system, the plurality of alert reports associated with a particular multi-tenant system prior to analyzing the plurality of alert reports from the single multitenant system.

14. A system comprising:
   a hardware processor interoperably coupled with a computer-readable medium storing computer instructions executable by the hardware processor to perform operations comprising:
      receiving, from a plurality of tenants in at least one multi-tenant system, a plurality of alert reports, each alert report representing at least one system alert incident associated with the plurality of tenants in the at least one multi-tenant systems;
      analyzing the plurality of alert reports for duplicate alert reports, wherein analyzing the plurality of received alert reports includes:
         identifying duplicate alert reports, wherein identifying the duplicate alert reports comprises:
            generating a hash code corresponding to each of the plurality of alert reports; and
            comparing each of the generated hash codes with each of the other generated hash codes and previously-generated hash codes associated with previously received alert reports to identify duplicate alert reports having similar generated hash codes;
         correlating each duplicate alert report of the plurality of duplicate alert reports into a correlated incident report; and
         aggregating the correlated incident reports into at least one summarized incident report.

15. The system of claim 14, the operations further comprising sending the at least one summarized incident report to a service provider cockpit for processing.

16. The system of claim 14, wherein correlating the plurality of alert reports comprises defining a correlation key, where the correlation key corresponds to at least one generated hash code of a particular alert report, the operations further comprising:
   identifying a common correlation key for at least two alert reports; and
   associating the at least two alert reports having the common correlation key with a correlated incident report.

17. The system of claim 14, the operations further comprising collecting, at a system tenant of a particular multi-tenant system, the plurality of alert reports associated with a particular multi-tenant system prior to analyzing the plurality of alert reports from the single multitenant system.

* * * * *